(12) United States Patent
Wolfe et al.

(10) Patent No.: US 7,114,944 B2
(45) Date of Patent: Oct. 3, 2006

(54) TACTICAL VENTING

(75) Inventors: David Kenneth Wolfe, Akron, OH (US); Douglas Edward Pryor, Uniontown, OH (US)

(73) Assignee: David Wolfe Design, Inc, Akron, OH (US)

( * ) Notice: Subject to any disclaimer, the term of this patent is extended or adjusted under 35 U.S.C. 154(b) by 288 days.

(21) Appl. No.: 10/761,662

(22) Filed: Jan. 21, 2004

(65) Prior Publication Data
US 2005/0156349 A1 Jul. 21, 2005

(51) Int. Cl.
*B29C 33/10* (2006.01)
(52) U.S. Cl. .................. 425/472; 249/141; 425/425; 425/812
(58) Field of Classification Search ............ 425/425, 425/435, 472, 812; 249/141
See application file for complete search history.

(56) References Cited

U.S. PATENT DOCUMENTS

| | | | | |
|---|---|---|---|---|
| 3,068,523 A | * | 12/1962 | Adinoff et al. | ............. 425/812 |
| 3,854,852 A | * | 12/1974 | Carter | ......................... 425/812 |
| 4,474,717 A | * | 10/1984 | Hendry | ...................... 425/812 |
| 4,691,755 A | * | 9/1987 | Kuriyama et al. | .......... 425/812 |
| 4,966,543 A | * | 10/1990 | Krishnakumar et al. | .... 425/812 |
| 5,449,285 A | * | 9/1995 | Choiniere et al. | .......... 425/812 |
| 5,482,721 A | * | 1/1996 | Clark et al. | .................. 425/812 |
| 5,624,693 A | * | 4/1997 | Horling et al. | ............. 425/812 |
| 6,280,176 B1 | | 8/2001 | Boyce | |
| 6,367,765 B1 | | 4/2002 | Wieder | |

* cited by examiner

*Primary Examiner*—James P. Mackey
(74) *Attorney, Agent, or Firm*—David L. King

(57) ABSTRACT

A method of venting a rotational mold at a predetermined condition by actuating an actuating venting assembly pierces the shell of the molded article and introduces a passageway to relieve pressure during the molding cycle. The actuating venting assembly enables a tactical methodology for venting such molds.

17 Claims, 7 Drawing Sheets

TACTICAL VENTING

FIELD OF THE INVENTION

This invention relates to rotational molding of products generally and more particularly to venting such molds generally.

BACKGROUND OF THE INVENTION

Rotational molding or more commonly termed rotomolding, is a process whereby plastic parts can be manufactured. These parts are created by starting with a thermoplastic resin, usually introduced into the interior of a mold in a powder form. The mold is then heated using a convection heating or radiation process. The mold is rotated on two axes, typically perpendicular to one another. As the plastic heats it is also tumbled inside the mold. The plastic eventually reaches a temperature at which it fuses to the sides of the mold and to itself and forms a shell. The exterior of the shell of plastic retains the shape of the interior surface of the mold. The shell has a wall thickness that is somewhat uniform, although this uniformity is affected by the shape of the mold and the processing techniques used. The thickness of the part is determined by the amount of resin introduced into the mold.

In a typical rotomolding system, a mold is mounted at the end of a holding device, generally at the end of an arm. The arm is mounted at the opposite end to a hub. This hub may have several similar arms located evenly spaced around the hub, on the same plane, described by the axis of the arm. At the opposite end of the arm, the mold is mounted in any of a variety of ways. Sometimes the mold is mounted in a framework of tubing, also known as a spider, which allows multiple molds to be mounted and processed simultaneously, or it is mounted by itself. The holding device on which the mold is mounted has the capability to be rotated on two axes, perpendicular to one anther. Also the hub is able to rotate the entire arm assembly through various stages of the molding process. Generally, in a production environment, these states are: loading, heating (oven), cooling, and unloading.

This describes a common turret-style machine used in production of rotomolded parts. There are a variety of other styles of rotational molding machines that allow the mold to produce plastic parts. Other machines may have different mounting methods, perhaps a different description of rotation is imparted by the machine due to the unusual shape of the parts, as in a "rock and roll" machine. While other machines may not have the multiple arms described here, as in a single station or laboratory styles, rotomolding machine, the invention described herein, is applicable to any of these machine styles, but for purposes of a clear description of this invention, the turret-style machine will be used here as the exemplary apparatus.

While the equipment for rotomolding does have a variety of styles, the molding process, to which this device is applicable, is essentially the same. This device and its method of use can be used in any of these style machines.

The rotational molding process can be divided into four stages or steps: 1) loading, 2) molding involving heating, fusing and rotation, 3) cooling, 4) unloading; each step generally defined as follows:

1) Loading: Prior to the molding process, the mold is opened and charged with a predetermined weight of raw material, plastic resin that is ground into a powder consistency. The mold is then shut and bolted or clamped closed;
2) Molding: The mold is positioned in the oven. As the oven is brought up to a programmed temperature, the mold is rotated slowly on two axes of rotation to allow the plastic to tumble around the interior of the mold cavity; the tumbling is the effect of gravity as the raw material is raised inside the mold from the rotation. The rise in temperature inside the mold cavity causes the resin to fuse evenly to the sidewalls of the heated mold;
3) Cooling: After a predetermined amount of time rotating in the oven, the mold is pivoted or moved into a cooling station. The mold is cooled by air or water spray to a temperature that allows the mold to be opened;
4) Unloading: The mold is split apart and the part is removed from the mold.

To form a molded article, a moldable material, typically a powdered resin of a predetermined weight is loaded into the mold. During the molding process, the mold is placed in a heated environment of sufficient temperature to fuse the powdered resin onto the internal walls or interior surfaces of the mold. As the mold rotates, the powder drops onto the opposite wall by gravitational effect. The rotation of the mold is not fast enough to impart centrifugal force onto the plastic resin; therefore, the tumbling effect on the resin can coat the mold to a sufficiently accurate wall thickness to create a uniform plastic product.

Rotational molds are fabricated having internal uniform walls or surfaces forming hollow, thin-walled molds representing the finished shape of the product manufactured. The mold can be aluminum, sheet metal, or other materials which allow the conduction of heat from the oven into the interior cavity of the mold.

During the rotomolding process, the interior of the mold will build up pressure. As the mold is coated with plastic, by heating and tumbling through the bi-axle rotation, the pressure building up inside the interior cavity has to be vented to the atmosphere. If not, the part may develop "blow holes" where the pressure escapes through weak areas of the part, usually around the parting line of the mold. Also, a vacuum can occur during the cooling cycle which will result in a part that collapses or deforms as the air pressure drops below the atmospheric pressure.

To provide venting to such molds, most rotomolders use a hollow tube that is fixed to the outside of the mold, projecting into the mold perpendicular to the surface to which the tube is mounted. The tube is usually stuffed with a packing filter media like fiberglass, wool or steel wool, which allows the gas to escape but keeps the powdered plastic inside the mold. This practice has its drawbacks. Often different operators will pack the tubes with filter media too tightly; this results in excessively high pressure in the cavity and results in "blow holes." If the media is packed too loosely, it can come out of the mold. If not changed in a timely manner, the plastic resin will occlude the packing filter media in the tube and resulting pressure rise will lead to the "blow hole" problems listed above.

To address this problem, Alden C. Boyce invented a special vent tube system which is described in U.S. Pat. No. 6,280,176 granted Aug. 28, 2001. The Boyce vent tube employed an elongated central bore in a probe-like rod divided into three sections. Counter bores in conjunction with the central bore provides an air escape passageway, which communicates with the interior of the mold via plurality of pore-like holes arranged in a band just above the innermost top of the vent. To solve the packing material problem of prior art vent tubes, Boyce provided small beads in the central bore which were retained by a perforated disk and retaining clip. This Boyce tube vent purportedly eliminated the need to service the vent by cleaning and repacking the vent after every mold cycle.

The present invention provides a unique venting device that not only eliminated the clogging and vent servicing requirements, but also enables a unique and superior method of rotational molding to be achieved.

SUMMARY OF THE INVENTION

A method of rotational molding an article is disclosed. The method includes loading an internal cavity of a mold with moldable material, heating the loaded mold, rotating the loaded mold tumbling and heating the moldable material sufficient to form a shell along surfaces of the interior cavity of the mold, piercing the shell forming an opening in the moldable material, venting the interior cavity after a predetermined condition occurs, cooling the mold and opening the mold and removing the molded article.

The predetermined conditions to initiate venting include any one of a predetermined time, or a predetermined pressure, or a predetermined temperature or a combination of said predetermined conditions.

The step of piercing the shell includes the step of actuating one or more piercing tips causing a movement through the shell after the predetermined condition occurs.

The step of venting includes the step of positioning a vent tube through the opening in the shell formed by the piercing tip.

Both the step of piercing and the step of venting can be achieved by the step of actuating one or more venting assemblies attached to the mold. The one or more venting assemblies have a movable piston with a stem having vent passages, the stem being advanced into or moved by the actuating a movable piston. The stem includes a piercing tip at an end of the stem wherein actuating the one or more venting assemblies moves the piercing tip of the stem thereby piercing the shell which permits internal pressure to escape through the vent passages of the stem.

This method is best performed using a rotational mold having a mold having an internal cavity for molding an article; a means of rotating the mold; an actuating venting assembly attached to the mold; and a means for actuating the actuating venting assembly. The actuating venting assembly has a vent housing attached to the mold and inserted through, or aligned with, an opening in the mold, and a movable piston. The piston has a piston body, a stem with vent passages, the stem having a first end and a second end, the first end being adjacent or integrally connected to, or part of, the piston body, and a means for piercing the molded article at the second or distal end of the stem. The actuating venting assembly provides a means for piercing the molded article and venting internal pressure within the internal cavity of the mold, the means for piercing preferably being a piercing tip. The piercing tip can be removably attached to the stem if so desired for ease of replacement. Similarly, the stem can be removably attached to the body of the piston. Alternatively, the stem can be an integral part of the piston being an extension projecting from the body of the piston.

The ability to perform the method is best achieved using an actuating venting assembly for rotational molds having a housing and a piston. The housing is attached to the mold being aligned with or partially inserted through an opening in a rotational mold. The housing has an internal cylinder. The movable piston has a body mounted in the internal cylinder and a stem with vent passages for allowing for internal pressure of the mold to be vented upon actuation.

The stem extends from the body of the piston to a distal end in a preferred embodiment. In a preferred embodiment, the stem is a hollow tube having a central opening or bore and one or more venting passages, or openings, adjacent the distal end and one or more venting passages, or openings, in proximity to the piston body. These openings or passages are all in fluid communication with the central opening of the hollow tube.

The actuating venting assembly preferably employs a piston retraction means. The piston retraction means moves the piston body and stem away from the internal cavity of the mold holding the valve in a closed position until actuated. The piston retraction means may be a spring. The piercing tip can be made of a heat resistant material such as polyetheretherketone (PEEK) or polytetrafluoroethylene (PTFE) or any other suitable heat resistant material.

In one alternative embodiment the stem and the piston can be two separate pieces. The piston body is adjacent to an end of the stem and simply pushes the stem inwardly towards the internal mold cavity when the venting assembly is actuated. In this embodiment the use of a retraction means, such as a spring, is captively retained on the stem which pushes on the stem moving the stem and the piston when the actuating venting assembly is moved to the vent-closed position.

In another alternative embodiment, the stem is a solid rod with external grooves to form the vent passage. The grooves extend along the rod longitudinally. This stem, optionally, can be surrounded by a sleeve in the mid section of the rod.

BRIEF DESCRIPTION OF THE DRAWINGS

This invention will be described by way of example and with reference to the accompanying drawings in which.

DETAILED DESCRIPTION OF THE INVENTION

Figure 1:
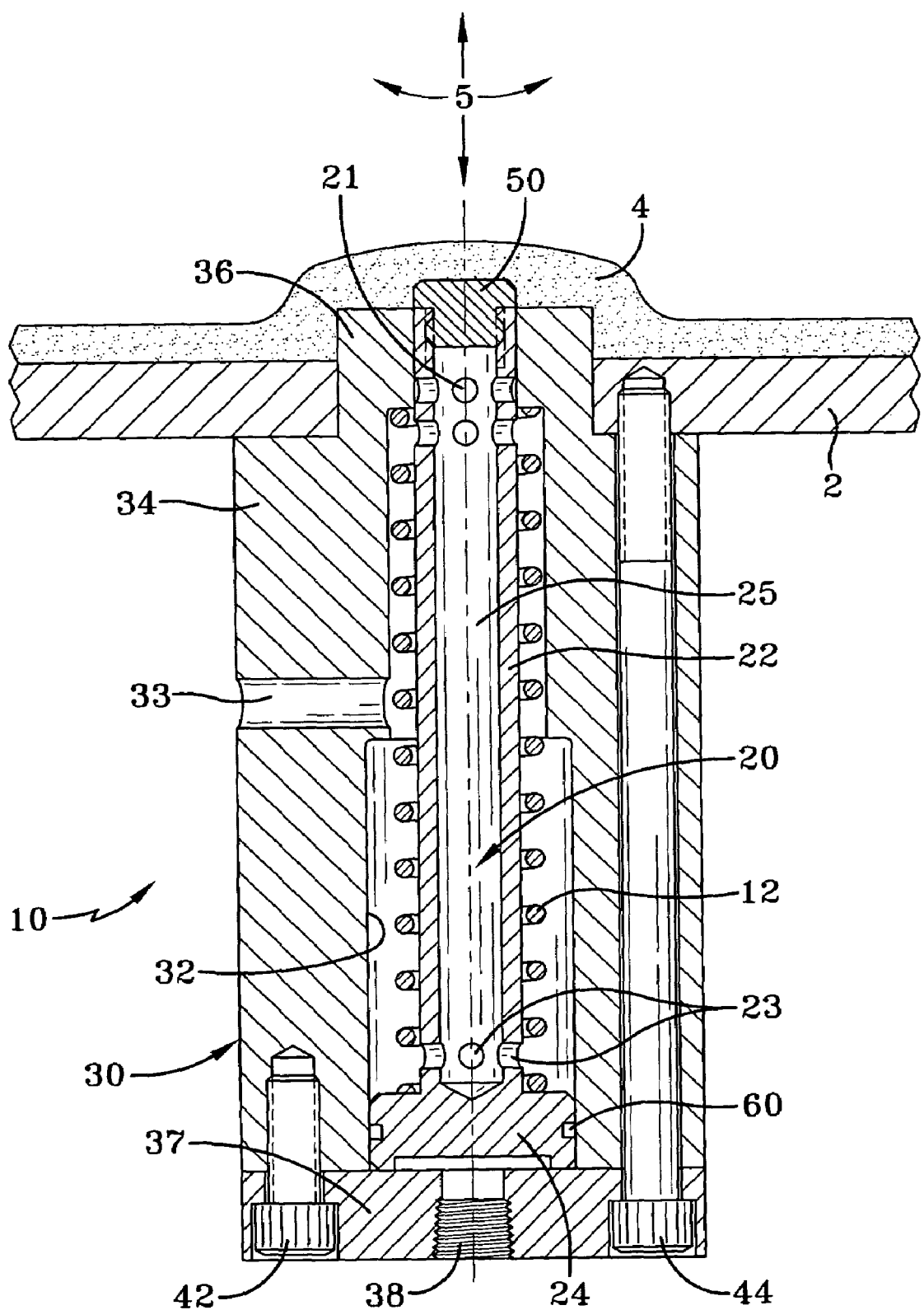
FIG. 1 is a cross sectional view of a portion of a rotational mold with the venting assembly according to the present invention, the venting assembly being in the vent-closed position.

With reference to FIG. 1 there is shown a portion of a rotational mold 2 having an opening for accepting the actuating venting assembly 10 attached as illustrated.

As used herein, the term Tactical Venting Assembly is used to describe the ability to selectively determine when the internal mold cavity pressure build up is relieved. Historically, the venting of the mold 2 was either always occurring because the vent tubes were open to the atmosphere, or alternatively, not vented due to no use of vents or occluded vents. The present invention enables the mold operator to determine precisely when the venting should occur for a particular mold. Each rotational molded part design is somewhat unique in the size, shape, material required in terms of physical properties, and loaded weight. Accordingly, the operator would like to optimize molded product quality and production output. The tactical or actuating venting assembly of the present invention permits superior product uniformity to be achieved and in many cases reduces the mold cycle time.

Figure 2:
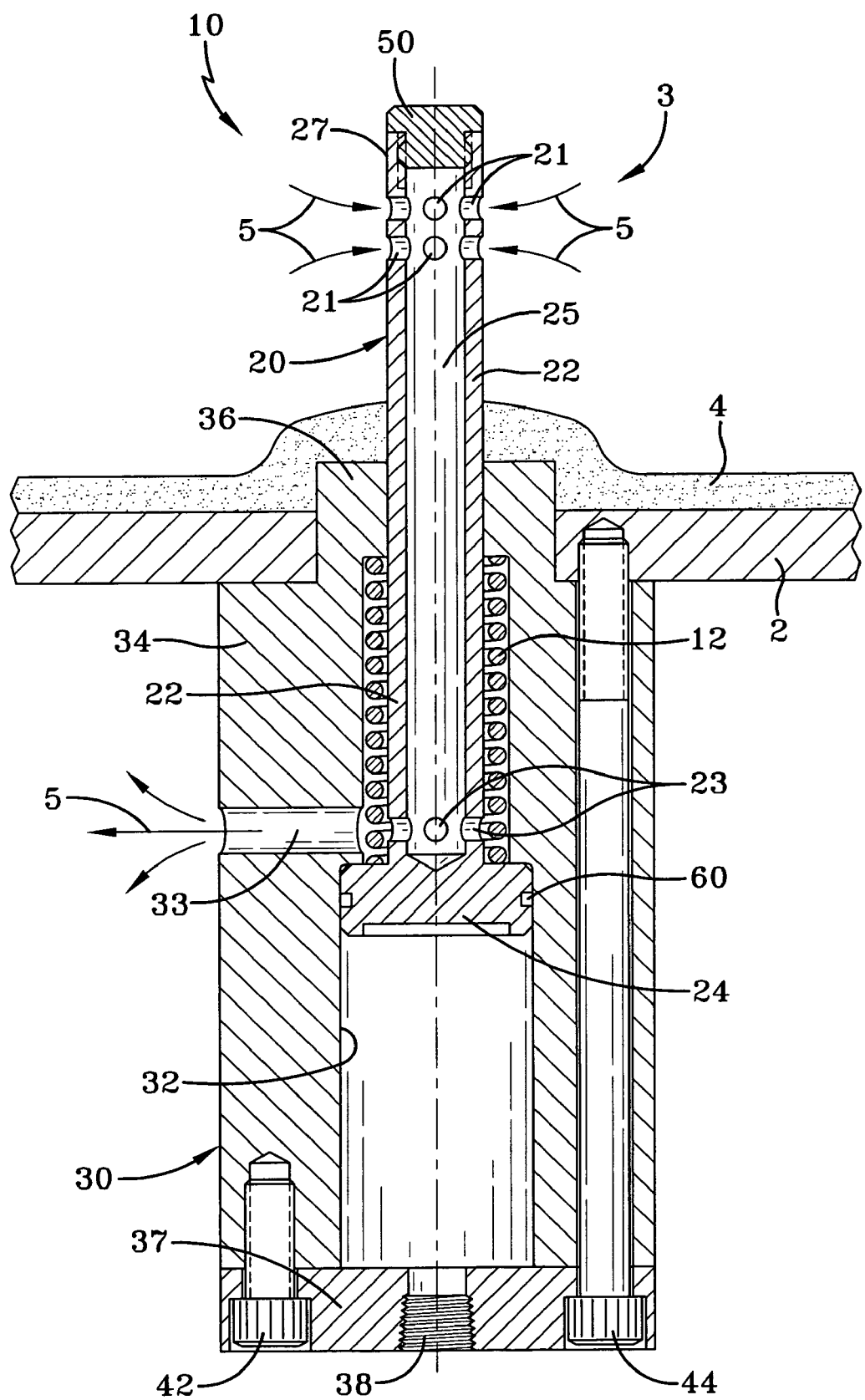
FIG. 2 is a cross sectional view of the venting assembly and mold taken from FIG. 1, the venting assembly being shown in the vent-open, or the fully-actuated position.

As shown, in FIGS. 1 and 2 the venting assembly 10 has a housing 30, a piston 20, a vented stem 22, a piercing tip 50, and a retraction means 12. The housing 30 has a larger diameter portion 34 which can be attached to the outside of the mold 2 using a fastening means 44. As shown, threaded fasteners 44 can be used to hold the venting assembly 10 attached to the mold 2. The smaller diameter shank 36 of the housing 30 protrudes through an opening in the mold 2 and as shown extends slightly into the mold cavity 3. The housing 30 has an opening with a large diameter internal cylinder 32, or bore, which holds the body 24 of the piston 20 and the retraction means 12 as shown. The stem 22 of the piston 20 extends from the body 24 through the smaller opening in the shank 36 of the housing 30. The housing cylinder 32 provides a sufficient space such that the piston body 24 can slide a distance sufficient to allow a piercing tip 50 at the distal end 27 of the stem 22 to penetrate through the wall of molded parts 4 and into the internal cavity 3 of the mold 2.

Figure 5:
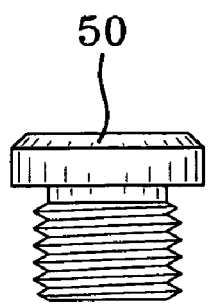
FIG. 5 is a plain view of the piercing tip of the present invention.
Figure 6:
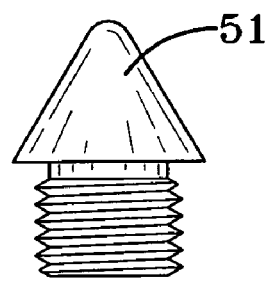
FIG. 6 is a plain view of an alternatively shaped piercing tip.
Figure 7:
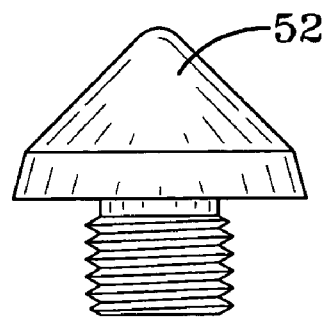
FIG. 7 is a plain view of another alternatively shaped piercing tip.

With reference to the stem 22 of the piston 20 as shown in FIGS. 1 and 2, the stem 22 has a hollow tube-like end with a plurality of openings 23 adjacent or near the body 24 of the piston 20 and another plurality of openings 21 close to the distal end 27 of the stem 22 arranged in two rows of transverse openings 21 connected to a central opening 25 or the central opening bore 25, extending to the body 24 and communicating with the plurality of transverse openings 23 near the body 24 to form an open airway passage through the stem 22. At the distal end 27 of the stem 22 a piercing tip 50 is shown, the piercing tip 50 can be flat, as shown in FIG. 5, dome-like or preferably cone-like shaped tips 51 and 52 as shown in FIGS. 6 and 7 respectively. The piercing tip 50, 51, and 52 must be capable of penetrating through the wall of the molded article 4 a distance sufficient to expose the openings 21 at the distal end 27 of the stem 22 to the internal gases 5 inside the mold cavity 3.

As shown in FIG. 2, this piercing and actuation of the venting assembly 10 occurs when air pressure or the other fluid median is applied to the housing cylinder 32 through an end cap 37 having a threaded opening 38 for accepting an air pressure hose (not shown). The end cap 37 is held by fasteners 42 to the housing 30. This pressure pushes on the body 24 and slides the entire piston 20 inwardly compressing the retraction means 12. As shown, the retraction means 12 is a coil spring 12. The external pressure charging the cylinder 32 of the housing 30 and actuating the venting assembly 10 can be prevented from entering the mold by means of an optional O-ring type seal 60. Once the venting assembly 10 is actuated, the hot gases 5 internal to the mold 2 are released through the openings 21, 23, 25 in the stem 22 and exhausted through one or more openings 33 in the housing 30 as shown.

Once the mold 2 is sufficiently vented, the air pressure can be shut off and the retraction means 12 will push the piston 20 into a vent-closed position as shown in FIG. 1.

Figure 8:
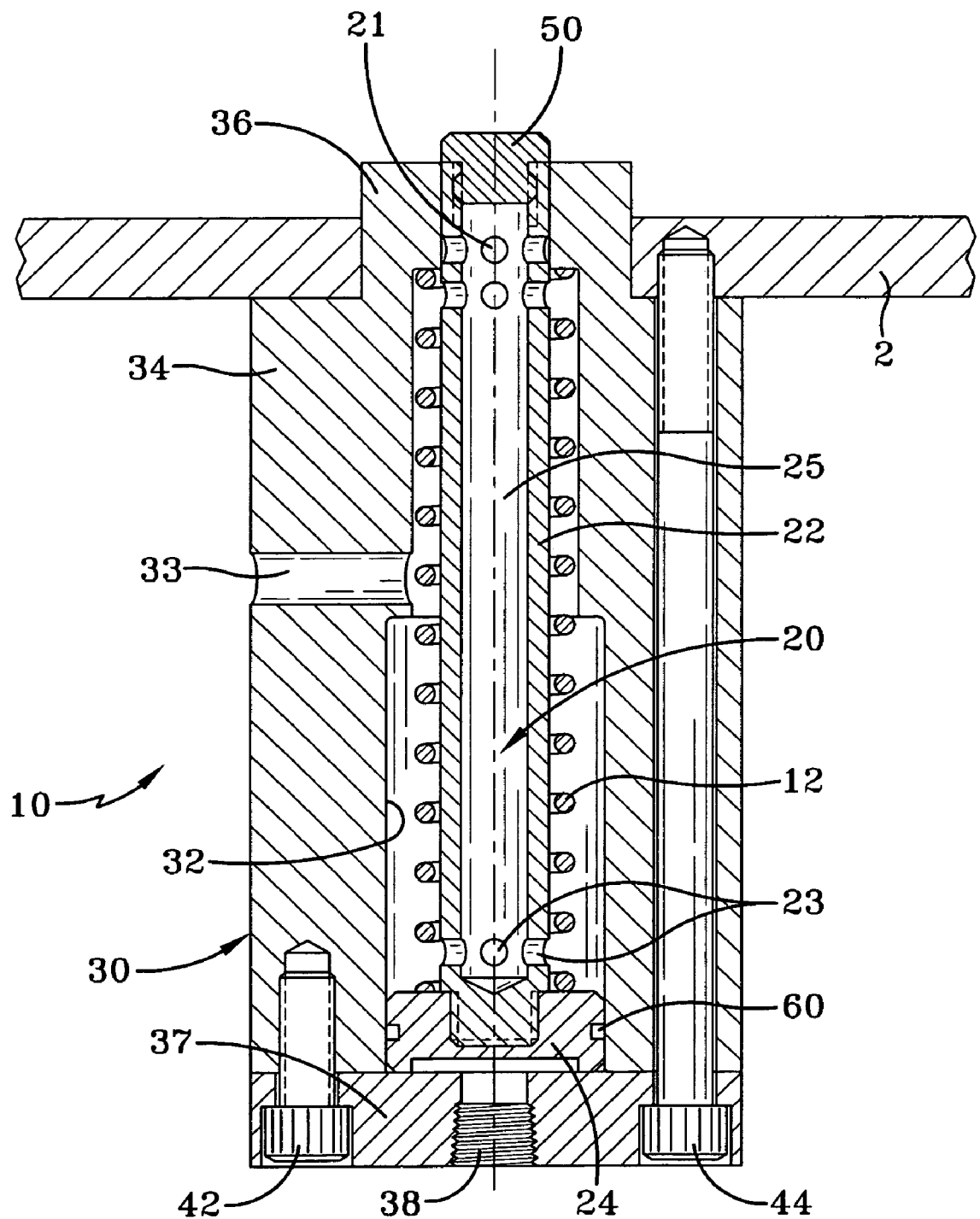
FIG. 8 shows the venting assembly wherein the stem is removably attached to the piston.
Figure 9:
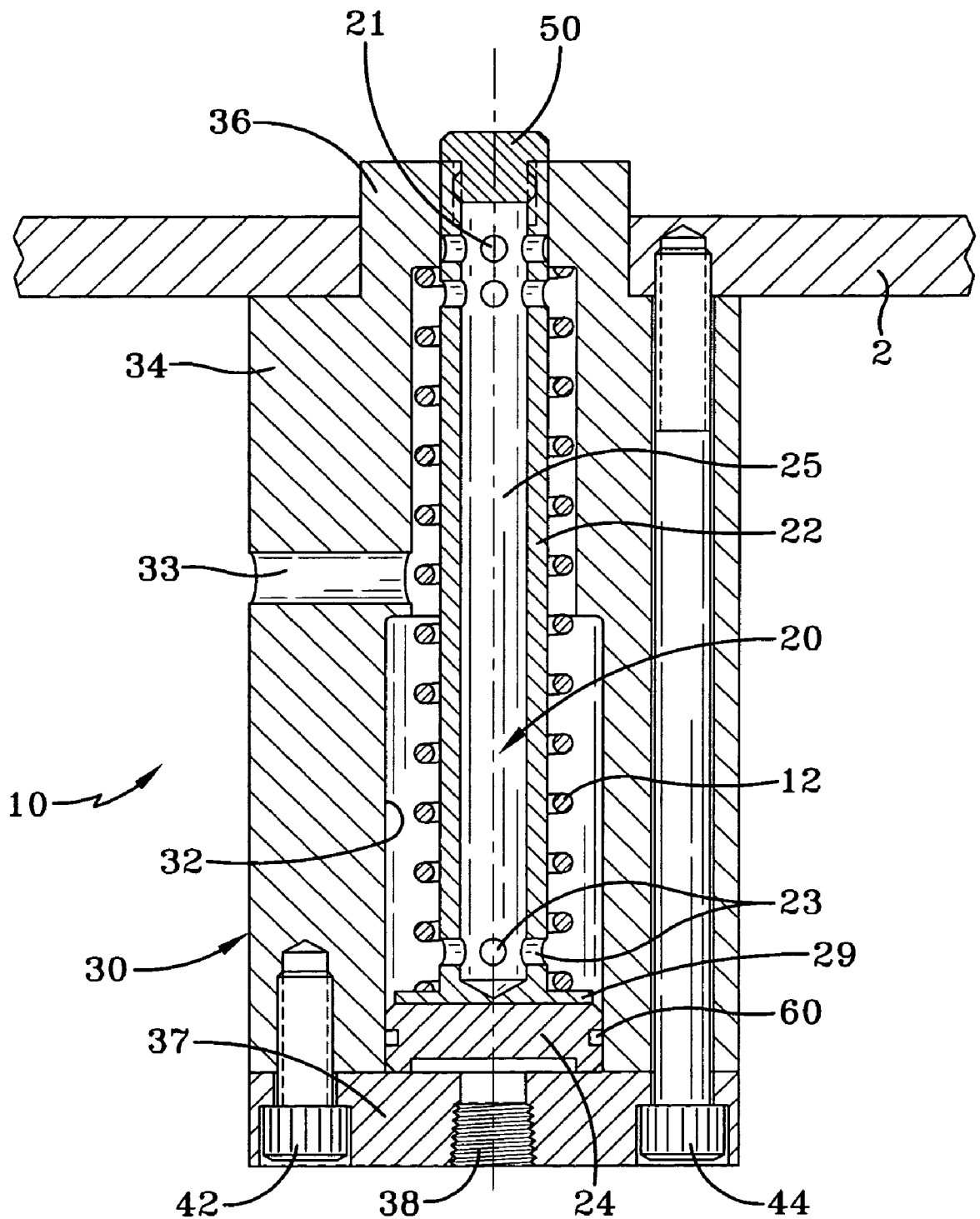
FIG. 9 shows the venting assembly wherein the stem is separate, but adjacent to the body of the piston.

The vent stem 22 and the body 24 of the piston 20 may be made as one part as shown in FIG. 1–4 or two components physically attached as shown in FIG. 8. Alternatively, the stem 22 and piston body 24 can be two separate abutting components wherein the piston body 24 simply pushes the stem 22 into the vent open position and the retraction means 12 would be connected to a collar 29 shown on the stem 22 and would enable the stem 22 to push the separate piston body 24 into the vent-closed position as shown in FIG. 9.

Figure 3:
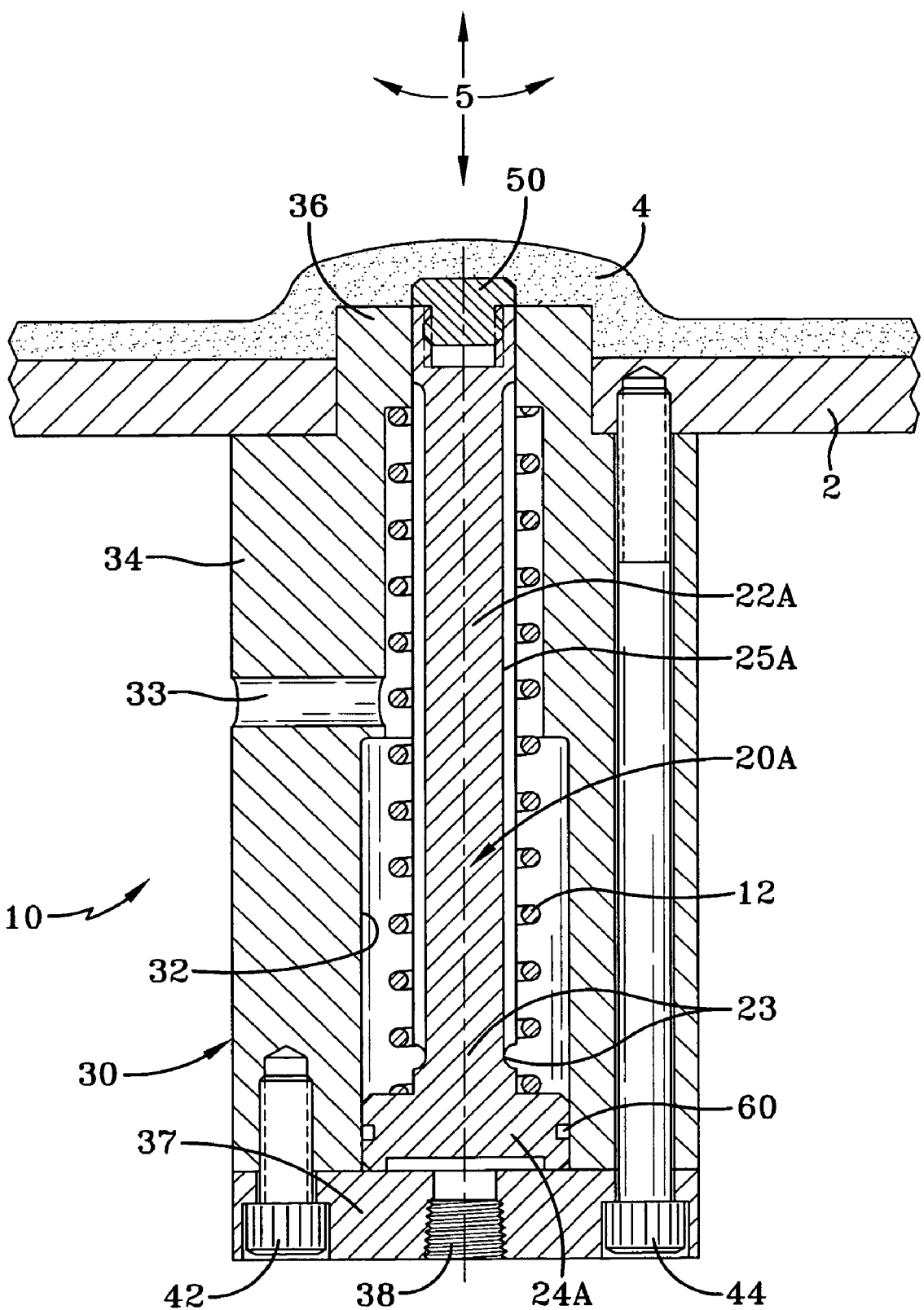
FIG. 3 is a cross sectional view of a portion of a rotational mold with the venting assembly according to an alternative embodiment of the present invention, the venting assembly being in the vent-closed position.
Figure 4:
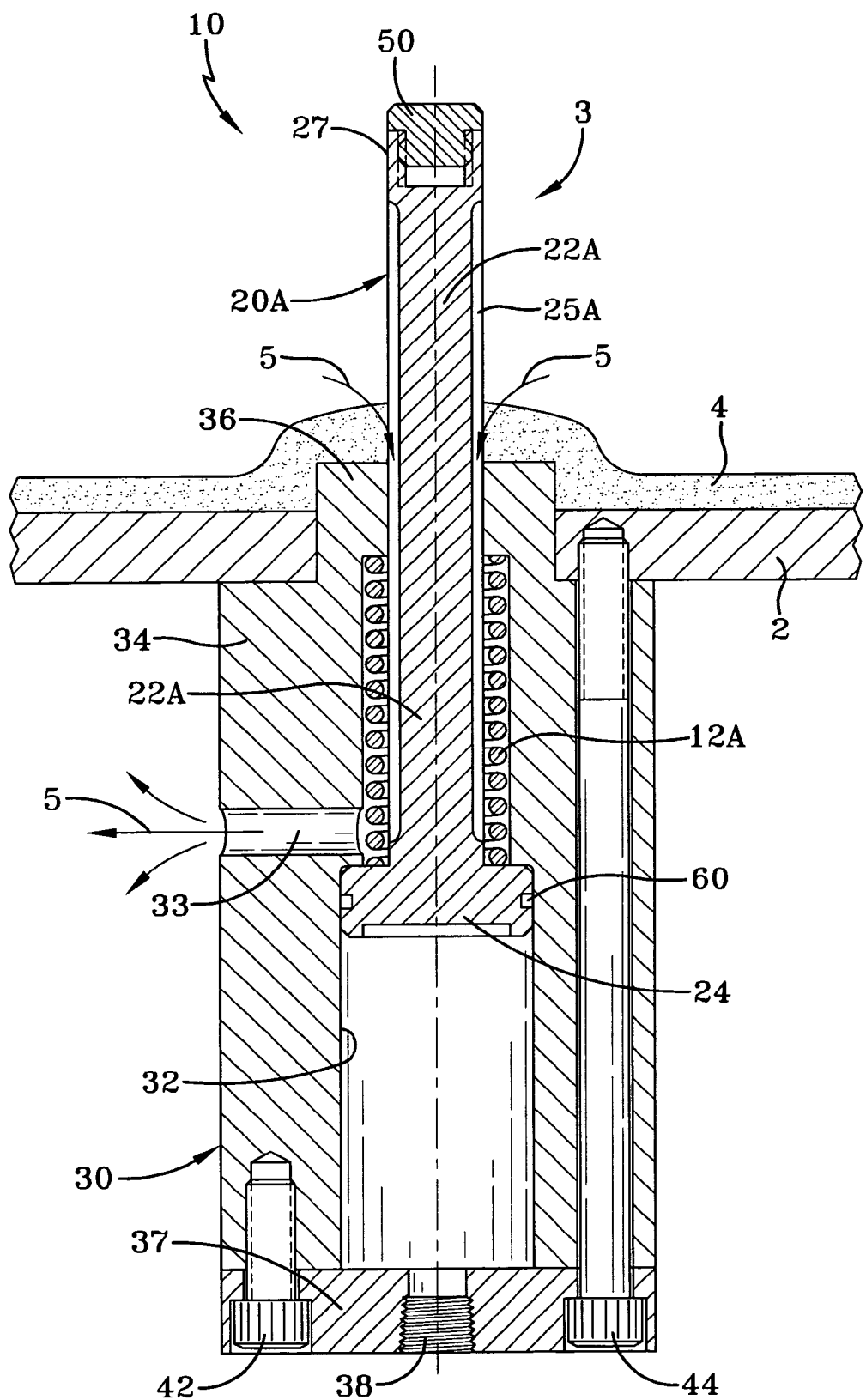
FIG. 4 is a cross sectional view of the alternative venting assembly and mold taken from FIG. 3, the venting assembly being shown in the vent-open, or fully actuated position.

With reference to FIGS. 3 and 4, an alternative embodiment of the present invention, shows the venting assembly 10 with a piston 20A. The stem 22A may be a solid rod with one or more external passages or longitudinal grooves 25A to form the venting passageway as an example of the various ways in which an airway passage can be designed. In such a design, a sleeve (not shown) can optionally be mounted on the mid section of the stem 25A if so desired.

What is considered important is the airway passage of the stems 20 or 20A created can be moved to the mold cavity 3 after the molded part 4 has formed onto the mold walls.

It is believed that a significant reduction in mold cure cycle can result using the actuating venting assembly 10 because the rising pressure and temperature is allowed to assist in the molding process and venting only has to occur just prior to any damaging over pressurizing of the mold 2.

Similarly, because the shell of the part 4 is already formed when the venting assembly 10 is actuated, very little, if any, free material is available to clog the vent openings. This means vent cleaning is reliably made almost unnecessary.

It is understood that the various components forming the venting assembly 10 can be manufactured utilizing various materials. The components must be able to perform in the heat in the molding process without degradation and must perform consistently throughout a reasonable lifespan. These materials include, but are not limited to, stainless steel, bronze alloys, aluminum, or composite matrices containing materials such as carbon fiber or ceramics, polytetrafluoroethylene (PTFE), Teflon, polyetheretherketone (PEEK), or similar heat-resistant materials.

By leaving the venting assembly 10 in the actuated position during the cooling cycle of the mold 2, the pressure in the inside of the cavity 3 of the mold 2 will remain equal with the ambient air pressure. In this way, the molded parts 4 will not be able to collapse as the mold 2 cools.

As noted above, actuation of the venting assembly 10 can be programmed on the rotomolding equipment, or triggered manually at the molding machine. Air lines routed to the bottom of the tactical or actuating venting assembly 10 will raise the pressure on the bottom side of the piston body 24, 24A and drive the entire piston 20, 20A forward. When pressure is released from the bottom of the piston body 24, the entire piston 20 and 20A moves down in a resting position. A coil spring 12 on top of the piston body 24, 24A, concentric with the stem 22 or 22A is designed to return the venting assembly 10 to its resting, or vent-closed position.

After cooling, the part 4 can be removed from the mold 2 and the mold 2 reloaded with material to produce a second part.

The above description describes the best mode of practicing the present invention. It is understood and has been illustrated that various alternatives designs can be contemplated and/or component substitutions such as elastomeric springs in place of coil springs for the retraction means or the use of double action pistons or even solenoids to open or close the actuating venting assembly 10 are possible. Similarly, such alternatives are considered in the scope of the present invention as claimed herein.

What is claimed is:

1. An actuating venting assembly for rotational molds comprises:
   a housing for attachment to the mold and being aligned or partially inserted through an opening to an internal cavity in a rotational mold, the housing having an internal cylinder;
   a movable piston, the movable piston having a body and a stem, the body being mounted in the internal cylinder, the stem having vent passages for allowing internal pressure of the mold to be vented upon actuation; the stem being adjacent to or extending from the body of the piston to a distal end; wherein the stem is a hollow tube having one or more venting passages adjacent to the distal end and one or more venting passages in proximity to the piston body in communication through a central opening or bore end in the hollow tube.

2. The actuating venting assembly of claim 1 further comprises:
   a piercing tip, the piercing tip being located at the distal end of the stem.

3. The actuating venting assembly of claim 1 wherein the piercing tip is removably attached to the stem.

4. The actuating venting assembly of claim 1 wherein the stem is removably attached to the body of the piston.

5. The actuating venting assembly of claim 1 further comprises:
   a piston retraction means; the piston retraction means for moving the piston away from the internal cavity of the mold.

6. The actuating venting assembly of claim 5 wherein the piston retraction means is a spring.

7. The actuating venting assembly of claim 2 wherein the piercing tip is made of a heat resistant polyetheretherketone (PEEK) or polytetrafluoroethylene (PTFE).

8. The actuating venting assembly of claim 1 wherein the stem is an integral extension of the body of the piston.

9. The actuating venting assembly of claim 1 wherein the body of the piston and the stem are separate but adjacent.

10. An actuating venting assembly for rotational molds comprises:
    a housing for attachment to the mold and being aligned or partially inserted through an opening to an internal cavity in a rotational mold, the housing having an internal cylinder;
    a movable piston, the movable piston having a body and a stem, the body being mounted in the internal cylinder, the stem having vent passages for allowing internal pressure of the mold to be vented upon actuation; the stem being separate but adjacent to the body of the piston and extending to a distal end.

11. The actuating venting assembly of claim 10 further comprises:
    a piercing tip, the piercing tip being located at the distal end of the stem.

12. The actuating venting assembly of claim 11 wherein the piercing tip is removably attached to the stem.

13. The actuating venting assembly of claim 10 further comprises:
    a piston retraction means; the piston retraction means for moving the piston away from the internal cavity of the mold.

14. The actuating venting assembly of claim 10 wherein the piston retraction means is a spring.

15. The actuating venting assembly of claim 11 wherein the piercing tip is made of a heat resistant polyetheretherketone (PEEK) or polytetrafluoroethylene (PTFE).

16. The actuating venting assembly of claim 10 wherein the stem is a rod having one or more longitudinally extending grooves forming said vent passages.

17. The actuating venting assembly of claim 10 wherein the stem is a hollow tube having one or more venting passages adjacent to the distal end and one or more venting passages in proximity to the piston body in communication through a central opening or bore end in the hollow tube.

* * * * *